United States Patent [19]

Hata

[11] 4,361,425
[45] Nov. 30, 1982

[54] DEHUMIDIFIER

[75] Inventor: Yasuhisa Hata, Akashi, Japan

[73] Assignee: Nippon Air Brake Co., Ltd., Kobe, Japan

[21] Appl. No.: 267,129

[22] Filed: May 26, 1981

[30] Foreign Application Priority Data

Jun. 14, 1980 [JP] Japan .............................. 55-83179[U]

[51] Int. Cl.³ .................................................. B01D 45/12
[52] U.S. Cl. ............................................. 55/218; 55/309; 55/337; 55/389; 55/417
[58] Field of Search ................................ 55/312–314, 55/316, 218, 337, 309, 387–389, 417, 420

[56] References Cited

U.S. PATENT DOCUMENTS

| | | | |
|---|---|---|---|
| 2,537,992 | 1/1951 | Gross et al. ........................... | 55/498 |
| 3,378,993 | 4/1968 | Veres et al. ........................... | 55/219 |
| 3,705,480 | 12/1972 | Wireman ............................... | 55/275 |
| 3,841,064 | 10/1974 | Hitchiner et al. ..................... | 55/417 |
| 4,026,685 | 5/1977 | Grix ...................................... | 55/218 |

FOREIGN PATENT DOCUMENTS 54-136575 10/1979 Japan .................................... 55/387
1395788 5/1975 United Kingdom ................. 55/387

Primary Examiner—Bernard Nozick
Attorney, Agent, or Firm—R. S. Visk

[57] ABSTRACT

A dehumidifier for use in a compressed air system between an air compressor and a storage reservoir for removing moisture from the compressed air supplied to the storage reservoir. The dehumidifier is provided with a moisture-collecting chamber connected to a conventional drain valve which operates automatically periodically for draining the moisture from the moisture-collecting chamber. A high speed fan is installed adjacent the moisture-collecting chamber for subjecting the compressed air passing therethrough to centrifugal force, thereby removing moisture and other foreign particles contained in the compressed air, such moisture being forced by gravity to the bottom of the collecting chamber.

5 Claims, 3 Drawing Figures

DEHUMIDIFIER

BACKGROUND OF THE INVENTION

As is well known to those skilled in the art, compressed air systems, by virtue of condensation, are subject to moisture, which may cause valves and other mechanical devices in the system to rust. It is absolutely essential, therefore, that as much of the moisture as possible be removed from the compressed air before it is supplied to the devices utilizing this air. For this purpose, a dehumidifier is interposed in the air pressure circuit between the air compressor and the storage reservoir. The dehumidifier contains a desiccant material which, under normal circumstances, obstructs ventilation to a degree and becomes less efficient as moisture increases. Moreover, oil presence in the compressed air also causes deterioration and ineffectiveness of the desiccant. For this reason, dehumidifier systems have been provided with separators, the purpose of which is to remove moisture and foreign matter before the compressed air reaches the dehumidifier. With the addition of the separators, however, certain complexities arise concerning machinery and pipe distribution, because in some instances the separator is disposed in a removed position from the dehumidifier and is, therefore, less effective.

SUMMARY OF THE INVENTION

The object of the present invention, therefore, is to provide an effective dehumidifier capable of removing moisture as well as other foreign materials, such as oil, from compressed air before being supplied to the storage reservoir and the using devices.

Briefly, the invention comprises a housing having a container therein in which either a loose or preformed solid desiccant is disposed and through which compressed air is directed after having passed through a separating chamber in which a vane means is disposed between the separating chamber and the mouth opening to the desiccant chamber. Compressed air from the air compressor is directed to the separating chamber where the vane means, by centrifugal force and gravity, removes moisture and other foreign matter, which accumulates at the bottom of the separating chamber. A drain valve connected to the separating chamber and synchronized with the cyclical operation of the air compressor, in conventional manner, exhausts the accumulated condensate from the separating chamber to atmosphere.

DESCRIPTION AND OPERATION

Figure 1:
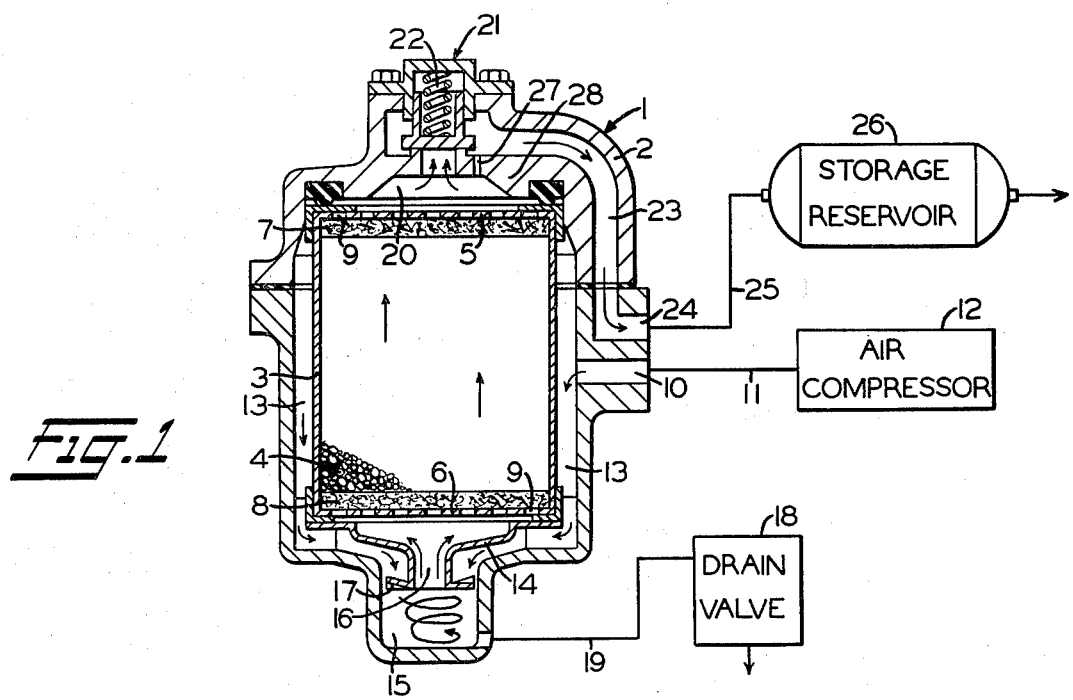
FIG. 1 is an elevational view, in section, of a dehumidifier embodying the invention.

As shown in FIG. 1, a dehumidifier embodying the invention comprises an outer housing 2 in which a cylindrical container 3 is coaxially secured. Container 3 is packed with a loose type desiccant 4, such as a zeolite for example, through which compressed air is directed for absorbing moisture therefrom. Respective perforated plates 5 and 6 are disposed at each end of container 3 with respective layers 7 and 8 of fibrous material disposed at each end between said plates and desiccant 4 for retaining the loose desiccant within the container. Each of plates 5 and 6 is provided with a plurality of perforations 9 to permit the compressed air to pass therethrough.

An inlet 10 formed in housing 2 is connected by way of a conduit 11 to the output side of an air compressor 12. Compressed air from air compressor 12 enters an annular space or relay chamber 13 formed between container 3 and the inner surface of housing 2 and coaxially surrounding said container.

Figure 3:
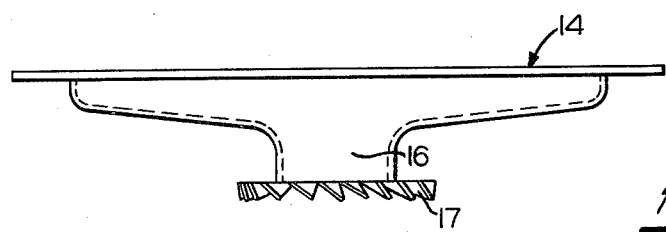
FIG. 3 is a detailed view, on a larger scale, than FIGS. 1 and 2, of a separating member comprising a component part of the dehumidifiers shown in FIGS. 1 and 2.

A partition member 14, shown on a larger scale, in outline in FIG. 3, is fixed against the bottom or lower end of container 3 and serves to separate said container from a separating or moisture-collecting chamber 15 formed on the bottom of housing 2. Separating member 14 is provided with an inlet neck 16 opening at one end to separating chamber 15 and at the other end to apertures 9 in plate 6.

According to the invention, a vane means 17 is mounted on the bottom end of separating member 14 between relay chamber 13 and separating chamber 15 to intercept compressed air flowing from said relay chamber to said separating chamber and subjecting said compressed air to a high speed, downwardly-directed spinning action so that any moisture and other foreign matter, such as atomized oil particles, are removed therefrom by centrifugal and gravitational forces. The moisture and other foreign matter thus removed from the compressed air are accumulated in chamber 15.

The accumulated condensate and other foreign matter in separating chamber 15 are periodically purged to atmosphere by a drain valve 18. Drain valve 18 is a conventional automatically operable drain valve connected to separating chamber 15 via a conduit 19. Since the details of drain valve 18 are not essential to an understanding of the invention, it will suffice to say that operation of said drain valve is synchronized with cyclical "cut-in" and "cut-out" stages of the air compressor. When pressure in the system attains a certain high value at which the compressor cuts out, drain valve 18 operates automatically to exhaust separating chamber 15 to atmosphere for a limited time interval.

In operation, compressed air from air compressor 12 flows via conduit 11 to inlet 10 and into relay chamer 13 whence it flows into vane means 17 which subjects it to a spinning action for removing water and other foreign matter by centrifugal action. The compressed air then flows through opening 16 into container 3 and through desiccant 4 where it is subjected to final drying action. From container 3, the compressed air flows, as indicated by the arrows, through a delivery chamber 20 and a check valve 21, if the pressure of such compressed air is sufficient for overcoming the opposing force of a spring 22, thence through a passageway 23 to an outlet 24 connected to a conduit 25 leading to a storage reservoir 26. Compressed air may also flow from container 3 to passageway 23 at a restricted rate through a choke 27 formed in a separating wall 28 between delivery chamber 20 and said passageway. Choke 27, being always open, has the effect of stabilizing operation of check valve 21.

When the pressure in reservoir 26 reaches its certain high value, a governor device (not shown) causes the compressor to be operated to its cut-out stage to either shut off or slow down to idling speed until the pressure in the system is reduced to its low value, at which time the governor operates to effect cut-in of the compressor.

Figure 2:
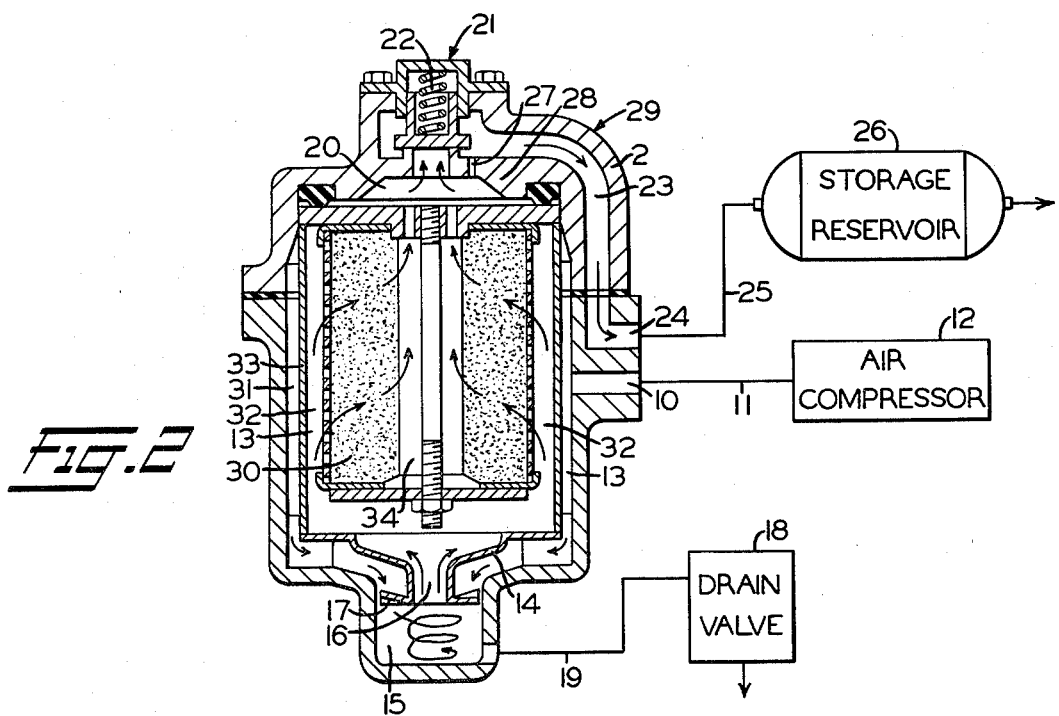
FIG. 2 is an elevational view, in section, of a modification of the dehumidifier shown in FIG. 1.

A modified dehumidifier 29 shown in FIG. 2 differs from the one shown in FIG. 1 in that the desiccant is a preformed solid block 30 comprising a porous material surrounded by or wrapped in an oil-type filter 31, through which desiccant and filter the compressed air is directed in its final drying stage.

Since many of the components of dehumidifier 29 are identified to corresponding components of dehumidifier 1, such components are identified with identical reference numerals.

The operation of dehumidifer 29 is similar to that of dehumidifier 1 except that when the air passes through neck 16 of partition member 14, it is directed to an intermediate chamber 32 formed between oil filter 31 and an outer cylindrical shell 33. The air passes through filter 31 wrapped around the desiccant block 30, thence into a central coaxial passageway 34 formed in said desiccant block 30, thence into delivery chamber 20, and from that point follows a course similar to that of dehumidifier 1.

Having now described the invention, what I claim as new and desire to secure by Letters Patent, is:

1. A dehumidifier for use in an air compressor system in which an air compressor supplies compressed air to a storage reservoir and a drain valve exhausts accumulated moisture to atmosphere, said dehumidifier comprising:
   (a) a housing having an inlet connected to the air compressor and an outlet connected to the storage reservoir; said housing further having formed at a lower portion thereof, a separating chamber, said separating chamber accumulates the moisture and other foreign matter until an exhaust operation occurs;
   (b) passage means formed in said housing via which compressed air may flow from said inlet to said outlet;
   (c) a tubular member interposed in and forming a part of said passage means with said housing, said tubular member having an inlet and a vane means interposed in said passage means upstream from said separating chamber for imparting a swirling motion to such air flow and directing such swirling air flow into said separating chamber thereby separating moisture and particulate material from such compressed air flow and passing the compressed air into the inlet of the tubular member; and
   (d) a body of desiccant material interposed in said tubular member and in said passage means for intercepting compressed air flowing therethrough and removing residual moisture therefrom.

2. A dehumidifier, as set forth in claim 1, further characterized by a drain valve connected to said moisture-collecting chamber for periodically exhausting accumulated moisture from said moisture-collecting chamber to atmosphere.

3. A dehumidifier, as set forth in claim 1, wherein said body of desiccant comprises a loose zeolite adsorbent contained within a container secured in said housing in the path of flow of the compressed air downstream of said fan.

4. A dehumidifier, as set forth in claim 1, wherein said body of desiccant comprises a preformed solid block of porous material secured in said housing in the path of flow of the compressed air and having a central coaxial passageway with said block so situated that compressed air passes therethrough from the outer side into said central passageway, thence into a delivery chamber connected to said outlet.

5. A dehumidifier, as set forth in claim 1, further characterized by a one-way check valve interposed in said passage means between said body of desiccant and said outlet, said check valve being operable to an open position, in which compressed air may flow therethrough to said outlet, in response to pressure of said compressed air sufficient for overcoming the force of a biasing spring for biasing the check valve toward a closed position in which such flow is interrupted; such operation of said check valve being stabilized by a restricted passageway formed in said housing in bypassing relation to said check valve.

* * * * *